United States Patent
Shimatani et al.

(10) Patent No.: US 7,718,929 B2
(45) Date of Patent: May 18, 2010

(54) COOKING TOP PLATE

(75) Inventors: Narutoshi Shimatani, Otsu (JP);
Toshimasa Kanai, Otsu (JP); Ukon Ishihara, Otsu (JP); Takeshi Nagata, Otsu (JP); Tsutomu Imamura, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 660 days.

(21) Appl. No.: 11/556,627

(22) Filed: Nov. 3, 2006

(65) Prior Publication Data
US 2007/0056961 A1    Mar. 15, 2007

Related U.S. Application Data

(62) Division of application No. 10/514,538, filed on Mar. 31, 2005, now Pat. No. 7,208,703.

(51) Int. Cl.
*H05B 3/68* (2006.01)
(52) U.S. Cl. .................. 219/443.1; 219/460.1
(58) Field of Classification Search ... 219/443.1–468.2; 126/39 H, 39 J, 90 A, 92 AC, 92 A, 92 B; 428/210, 426–429
See application file for complete search history.

(56) References Cited

U.S. PATENT DOCUMENTS

| | | | | |
|---|---|---|---|---|
| 5,183,997 A | * | 2/1993 | Lotz | 219/460.1 |
| 5,665,260 A | * | 9/1997 | Kawada et al. | 219/467.1 |
| 5,691,254 A | * | 11/1997 | Sakamoto et al. | 501/17 |
| 5,866,239 A | * | 2/1999 | Shimatani et al. | 428/210 |
| 6,492,622 B2 | * | 12/2002 | Melson et al. | 219/452.11 |
| 6,525,300 B1 | * | 2/2003 | Mitra et al. | 219/443.1 |

FOREIGN PATENT DOCUMENTS

| | | |
|---|---|---|
| JP | P61-165984 | 7/1986 |
| JP | U05-54908 | 7/1993 |
| JP | 10-273342 | 10/1998 |
| JP | 2000-281384 | 10/2000 |
| JP | 2000-302487 | 10/2000 |

* cited by examiner

*Primary Examiner*—Sang Y Paik
(74) *Attorney, Agent, or Firm*—J.C. Patents

(57) ABSTRACT

A substrate is made of a crystallized glass having translucency and an average linear thermal expansion coefficient of $-5 \times 10^{-7}/°C$. at 30 to 500° C. The substrate has a first surface (working surface) of a smooth surface having a surface roughness Rmax of less than 0.5 μm, and a second surface (non-working surface) of a rough surface having a surface roughness Rmax of 4 μm. A light shielding layer consisting of a light shielding film and an antioxidant film is formed on the second surface of the substrate through sputtering.

9 Claims, 2 Drawing Sheets

COOKING TOP PLATE

This application is a divisional application of, and claims the priority benefit of, U.S. application Ser. No. 10/514,538 filed on Mar. 31, 2005 now U.S. Pat. No. 7,208,703.

BACKGROUND OF THE INVENTION

The present invention relates to a cooking top plate.

As a domestic or commercial cooking device, not only a conventional gas cooking device employing a cooking stove but also an infrared heating cooking device employing a radiant heater or a halogen heater and an electromagnetic heating (IH) cooking device have been used recently.

A top plate used for an electromagnetic heating cooking device, for example, has been made of a low-expansion material such as a glass, ceramics, or a crystallized glass requiring a small electromagnetic induction heating amount in terms of thermal efficiency, safety, and thermal shock.

Further, a gas cooking device which had conventionally employed a top plate made of enamel or stainless steel has been employing a top plate made of a nonmetal material such as a glass, ceramics, or a crystallized glass each having low thermal expansion because of excellent appearance and cleaning properties of the material.

An intended purpose of a cooking top plate is to prevent scattering of water, a seasoning, food, or the like to a heating unit. However, a recently demanded purpose thereof is to improve appearance of the cooking device by screening an internal structure of the cooking device such as a heating unit or wiring.

When a nonmetal material is used for a top plate, a first method of screening an internal structure of a cooking device by the top plate is to use a low-expansion crystallized glass dark-colored with a transition metal element such as a crystallized glass GC-190 (available from Nippon Electric Glass Co., Ltd.) and Ceran (available from SCHOTT AG) each having a brown color.

A second method thereof is to form a light shielding film on a surface of a substrate made of a transparent low-expansion glass through printing. For example, JP 10-273342 A describes a top plate provided with a light shielding film composed of a glass and an inorganic pigment on a surface of a substrate made of a transparent low-expansion crystallized glass. The light shielding film has a larger thermal expansion coefficient than that of the substrate made of a low-expansion crystallized glass. Thus, in JP 10-273342 A, a porous light shielding film suppresses formation of cracks in the film. Further, JP 07-017409 B describes a top plate provided with a lustered film composed of a noble metal and a base metal on a surface of a substrate made of a transparent low-expansion crystallized glass.

However, the above first method requires preparation of a glass substrate for each color in production of top plates having different colors, which increases production cost. Further, a transition metal element suitable for a glass is limited, which limits production of multicolored top plates. Further, a top plate for an electromagnetic heating cooking device often has an indicator for displaying an applied electric energy or the like provided on a side of a non-working surface (surface facing inside of a cooking device) of the top plate. However, a red light of the indicator can be barely seen from a side of a working surface (surface facing outside of the cooking device). When the indicator emits a light of a color except red, the light of the color is not displayed on the side of the working surface because the top plate does not transmit a light of any color except red. Thus, when the indicator emits a light of a color except red, the top plate must be perforated to display a light of the color on a side of the working surface, resulting in a problem of easily causing chipping or cracks in the top plate.

Further, the above second method conventionally has a problem of difficulties in handling of the light shielding film because the light shielding film has low abrasion resistance and is easily peeled off. In particular, a porous light shielding film composed of a glass and an inorganic pigment has very low abrasion resistance and must be provided on a side of a non-working surface of the top plate. When a temperature sensor is bonded onto a light shielding film by a heat resistant resin, the heat resistant resin infiltrates into the light shielding film, causing a problem in that a portion having the heat resistant resin bonded appears different when seen from a side of a working surface of the top plate. Further, the inorganic pigment or the noble metal constituting the light shielding film has a problem of coloring a glass or causing glass defects such as stones in recycling of the top glass.

SUMMARY OF THE INVENTION

An object of the present invention is to provide a cooking top plate which is capable of attaining multi-coloring in one glass substrate and is excellent in abrasion resistance. Further, when a temperature sensor is bonded to the top plate by a heat resistant resin, a portion where the heat resistant resin is bonded does not appear different.

In order to attain the above object, the present invention provides a cooking top plate made of a low-expansion glass, including: a substrate having a first surface facing outside of a cooking device and a second surface facing inside of the cooking device; and a light shielding layer formed on at least one of the first surface and the second surface of the substrate through vapor deposition.

A light shielding layer formed through vapor deposition such as chemical vapor deposition (CVD), physical vapor deposition, ion plating, and sputtering can display various color tones by changing a material thereof. The light shielding layer is formed on the first and/or the second surface of the substrate, to thereby provide a top plate displaying various color tones even when one glass substrate is used as a substrate. Further, the light shielding layer has a dense structure and thus has excellent abrasion resistance. Even when the light shielding layer is a very thin film having a thickness of 2 μm or less, the light shielding layer has high light shielding ability. Thus, an inner structure of a cooking device such as a heating unit or wiring can be screened effectively. Moreover, a heat resistant resin for attaching a temperature sensor does not infiltrate into the light shielding layer, and thus a portion where the heat resistant resin is bonded does not appear different.

The light shielding layer has high light shielding ability, exhibiting sufficient light shielding effect even with a very thin light shielding layer. Thus, even when a material having a large difference in thermal expansion coefficient with a substrate is used, sufficient light shielding effect can be obtained while preventing formation of cracks in the light shielding layer by forming a thin light shielding layer on a surface of the substrate.

Vapor deposition for forming a light shielding layer preferably employs sputtering. A light shielding layer formed through sputtering is smooth, has a denser structure, and is firmly formed on the surface of a substrate. Thus, a stain of food, a seasoning, or the like adhered on a first surface of a top plate in use can be easily removed from the top plate having the light shielding layer formed on the first surface (working surface) of the substrate. Alternatively, the light shielding layer has excellent abrasion resistance, and thus the film is hardly peeled off when a cleanser or a brush is used for removing the stain.

The cooking top plate of the present invention has an average transmittance of 10% or less, preferably 7% or less, more preferably 6% or less at wavelength of 0.4 to 0.8 µm, to thereby provide excellent light shielding ability and screen an internal structure of the cooking device such as a heating unit or wiring.

The cooking top plate of the present invention has a transmittance of 0.25% or more, preferably 0.5% or more, more preferably 1% or more at wavelength of 0.45 to 0.75 µm, to thereby transmit a light of any color such as blue, green, yellow, or red of an indicator which can be visually observed from a side of the first surface (working surface) when the indicator for displaying an applied electric energy or the like is provided on a side of the second surface (non-working surface) of the substrate.

When the light shielding layer is a film which does not transmit a visible light or an infrared light, formation of a partially perforated pattern (mesh pattern, for example) or an entirely perforated pattern in a predetermined area of the light shielding layer facing the indicator allows transmittance of a light of any color such blue, green, yellow, or red of the indicator. In particular, when a light from a red visible light to an infrared ray only needs to be transmitted, an infrared ray transmitting film which transmits a light at wavelength of 0.6 to 2.5 µm and which screens a light at wavelength of 0.4 to 0.6 µm may be formed, to thereby screen an internal structure of a cooking device such as a heating unit or wiring. Preferable examples of the infrared ray transmitting film include an organic paint and a lustered film.

Further, the cooking top plate of the present invention preferably has an average transmittance of 0.5% or more, preferably 1% or more, more preferably 2% or more at wavelength of 0.4 to 0.8 µm, to thereby easily provide a transmittance of 0.25% or more, preferably 0.5% or more, more preferably 1% or more at wavelength of 0.45 to 0.75 µm.

The cooking top plate of the present invention preferably has an average transmittance of 10% or more, preferably 20% or more at wavelength of 1 to 2.5 µm. Such a cooking top plate is capable of heating by an infrared ray, which is a suitable top plate for an infrared ray heating cooking device employing a radiant heater or a halogen heater.

The light shielding layer preferably includes a light shielding film which contains: one metal selected from the group consisting of Si, Ti, Al, Nb, W, Mo, Sn, Cr, Pt, and Au; one alloy selected from the group consisting of stainless steel, hastelloy, inconel, and nichrome; a nitride of one alloy selected from the group consisting of stainless steel, hastelloy, inconel, and nichrome; or a nitride of at least one metal selected from the group consisting of Ti, Nb, W, and Mo. The top plate having such a light shielding layer exhibits excellent light shielding effect and can screen an internal structure of a cooking device such as a heating unit or wiring. Further, the top plate has a high regular reflectance and has an appearance of metallic luster, matching with a metallic cooking table or wall of stainless steel or the like provided near the cooking device. The light shielding layer has excellent chemical durability and thus is not colored or corroded by water, a detergent, a seasoning, or the like.

Formation of a partially perforated pattern (mesh pattern, for example) or an entirely perforated pattern in a predetermined area of the light shielding layer facing a radiant heater or a halogen heater easily results in an average transmittance of the top plate of 10% or more at wavelength of 1 to 2.5 µm, which is preferable for enhancing a thermal efficiency of the heater.

In the cooking top plate of the present invention, a light shielding layer is preferably removed in a liquid crystal display portion so that the liquid crystal display can be seen clearly. Further, an antireflective coating is preferably formed on at least one of, preferably on both of the first surface and the second surface of the substrate corresponding to the liquid crystal display portion to suppress reflection of a light from an illumination or the like, which is preferable because the liquid crystal display can be seen clearly.

Aluminum is preferably introduced into the above-mentioned metal, alloy, or metal nitride as a material for the light shielding film because aluminum converts to an oxide at an interface of the light shielding film to serve as a barrier, to thereby preferably improve heat resistance of the light shielding film.

In particular, a light shielding film made of titanium nitride gradually changes its appearance with a change in a nitrogen content in the film from silver, gold, dark red, to black from a small nitrogen content, to thereby provide a desired color tone easily.

The cooking top plate of the present invention preferably has a light shielding film made of Si (metal) so that an average transmittance tends to be 10% or more at wavelength of 1 to 2.5 µm.

The light shielding film may be composed of a film of one layer or of a film of two or more layers of different materials from each other. In the latter case, for example, a light shielding film composed of a film of two layers of an Si film and a Ti film thereon or thereunder can improve light shielding effect and heat resistance without deteriorating infrared ray transmitting property of the Si film to a large extent.

The light shielding layer preferably includes an antioxidant film in addition to the light shielding film. The antioxidant film may be formed on the light shielding film and/or between the surface of the substrate and the light shielding film. Formation of the antioxidant film suppresses oxidation of the light shielding film and deterioration of the light shielding film by heat. That is, when the antioxidant film is formed on the light shielding film as an upper layer (air side), the antioxidant film prevents oxidation of the light shielding film by oxygen in air. Further, when the antioxidant film is formed between the surface of the substrate and the light shielding film, the antioxidant film prevents oxidation of the light shielding film by oxygen in the substrate (low-expansion glass). In particular, when the light shielding film is formed on the first surface (working surface) of the substrate and the antioxidant film is formed thereon, or when the antioxidant film is formed on the second surface (non-working surface) of the substrate and the light shielding film is formed thereon, the top plate may display various color tones utilizing light interference by adjusting a material or a thickness of each film.

The antioxidant film preferably contains: a nitride of at least one metal selected from the group consisting of Si, Ti, Al, Nb, W, Mo, Ta, and Sn; or an oxide of one metal selected from the group consisting of Si, Al, and Ti, for high antioxidation ability.

The light shielding film or the antioxidant film is preferably made of a component in the substrate (low-expansion glass), more specifically, a nitride or an oxide of a metal such as Ti, Si, or Al. Thus, when the top plate is remelted as a glass raw material, a glass is not colored or glass defects such as stones are not formed.

A preferable first embodiment of the light shielding film includes, from the surface of the substrate: a first layer composed of a light shielding film having a geometric thickness of 10 to 1,000 nm, preferably 15 to 700 nm; and a second layer composed of an antioxidant film having a geometric thickness of 10 to 1,000 nm, preferably 15 to 700 nm.

A preferable second embodiment of the light shielding film includes, from the surface of the substrate: a first layer composed of an antioxidant film having a geometric thickness of 10 to 1,000 nm, preferably 20 to 700 nm; a second layer composed of a light shielding film having a geometric thickness of 10 to 1,000 nm, preferably 15 to 700 nm; and a third layer composed of an antioxidant film having a geometric thickness of 10 to 1,000 nm, preferably 20 to 700 nm.

In the first and the second embodiments described above, the light shielding film particularly preferably contains TiN, Si, Ti, AlTiN, W, or WN, for excellent heat resistance. Further, the antioxidant film preferably contains SiN, AlN, $SiO_2$, $Al_2O_3$, or $TiO_2$, for excellent antioxidation effect of the light shielding film.

The cooking top plate of the present invention may arbitrarily include a decorative film in addition to the light shielding film. When the light shielding layer is provided on a side of the second surface (non-working surface), the decorative film is formed between the substrate and the light shielding layer, or on the first surface (working surface). Further, when the light shielding layer is formed on a side of the first surface (working surface), the decorative film may be formed on the light shielding layer as an upper layer.

When the light shielding layer is formed on the second surface (non-working surface) of the substrate, characters or figures such as instructions for use, warnings, or captions on an indicator displaying temperature or heating power are preferably formed between the substrate and the light shielding layer. Thus, the characters or figures are not doubly indicated and are not scraped off when a cooking tool of a hard material such as pottery is used. The reason is that the characters or figures are formed in contact with the light shielding layer and a reflected image of the characters or figures is not formed on the light shielding layer. Further, the characters or figures are formed on the second surface (non-working surface) of the substrate, and a cooking tool of a hard material such as pottery and the characters or figures are not brought into contact with each other.

The decorative film or the characters or figures preferably have a different color or luster from that of the light shielding layer, so that the decorative film or the characters or figures can be seen clearly. Such a decorative film, or characters or figures may be formed through any method of vapor deposition or printing. For example, when the characters or figures are formed through screen printing, various characters or figures can be formed by merely changing a type of mesh (stencil printing plate) or an ink, which preferably increases a product type easily.

A low-expansion glass constituting the substrate may employ so-called a material having high thermal shock resistance withstanding quenching from 600° C., specifically a material having a thermal expansion coefficient of $50 \times 10^{-7}/°$ C. or less. Specific examples thereof that can be used include a low-expansion borosilicate glass, a silica glass, and a low-expansion crystallized glass having a β-quartz solid solution as a main crystal. A glass having an average thermal expansion coefficient of preferably $-10$ to $+30 \times 10^{-7}/°$ C., more preferably $-10$ to $+20 \times 10^{-7}/°$ C. at 30 to 500° C. has even higher thermal shock resistance. Even when a temperature distribution in a low-expansion glass sheet becomes large during combustion, stress is hardly caused and the glass hardly breaks. The low-expansion glass constituting the substrate preferably has translucency (property of transmitting visible light), and such a glass may be colored.

When a substrate of an electromagnetic heating cooking top plate is formed of a low-expansion glass having translucency (transmitting visible light), a light of the indicator displaying an applied electric energy or the like provided on the second surface (non-working surface) of the substrate can be visually observed from a side of the first surface (working surface) of the substrate. Thus, holes for visually observing the light of the indicator need not to be formed on the substrate, and thus chipping or cracks are hardly caused in the top plate.

When the first surface and/or the second surface of the substrate has a rough surface, a light from an illumination or the like is not reflected on a lustered light shielding layer formed on the second surface (non-working surface) of the substrate to directly enter into the eye. The light from an illumination or the like is scattered and thus is not glaring. In particular, when the second surface (non-working surface) of the substrate preferably has a rough surface and the first surface (working surface) of substrate preferably has a smooth surface, a stain of a seasoning, food, or the like hardly adheres on the first surface (working surface) and is easily wiped off.

The rough surface preferably has a surface roughness Rmax of 0.5 to 30 μm. When the rough surface has a surface roughness of less than 0.5 μm, a light from an illumination or the like is hardly scattered. When the rough surface has a surface roughness of more than 30 μm, a light shielding layer having a uniform thickness is hardly formed, and characters or figures are hardly printed. Further, a mechanical strength of the top plate tends to deteriorate. Note that, the term "smooth surface" as used above refers to a surface having a surface roughness (Rmax) of less than 0.5 μm.

The cooking top plate of the present invention is preferably subjected to antifouling treatment such as fluorine coating on a light shielding film, an antioxidant film, or a decorative film for excellent washing efficiency.

The cooking top plate of the present invention is a suitable top plate for an infrared ray heating cooking device employing a radiant heater or a halogen heater, an electromagnetic (IH) heating cooking device, or a gas cooking device.

DETAILED DESCRIPTION OF THE INVENTION

A cooking top plate of the present invention will be described in detail based on examples.

Figure 1:
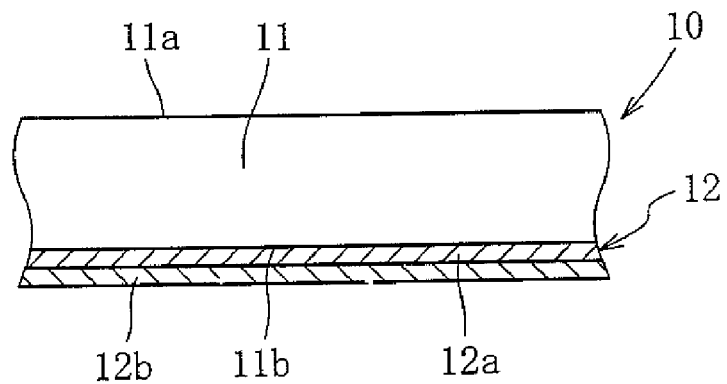
FIG. 1 is a partial sectional view of a cooking top plate according to an example of the present invention.
Figure 2:
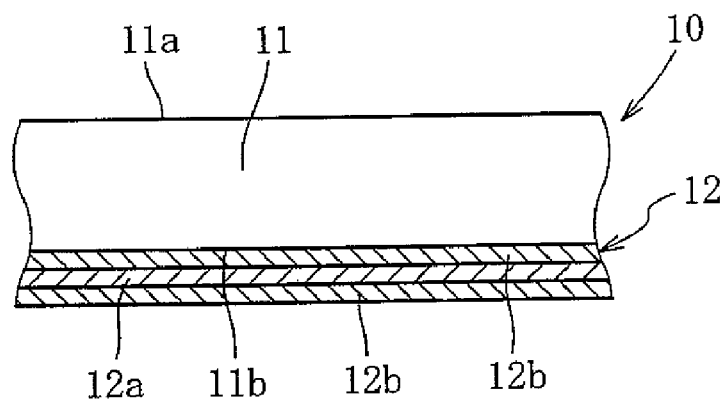
FIG. 2 is a partial sectional view of a cooking top plate according to another example of the present invention.
Figure 3:
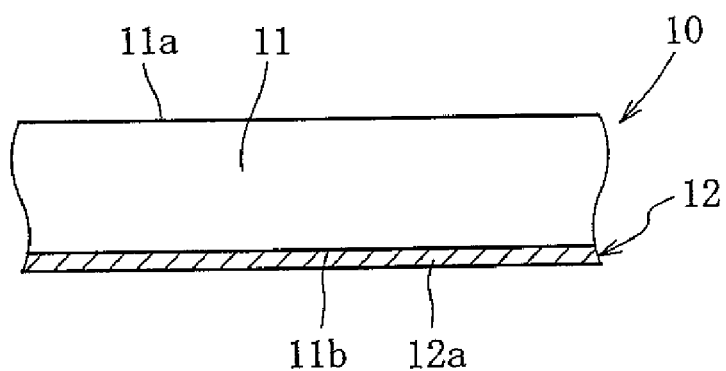
FIG. 3 is a partial sectional view of a cooking top plate according to still another example of the present invention.
Figure 4:
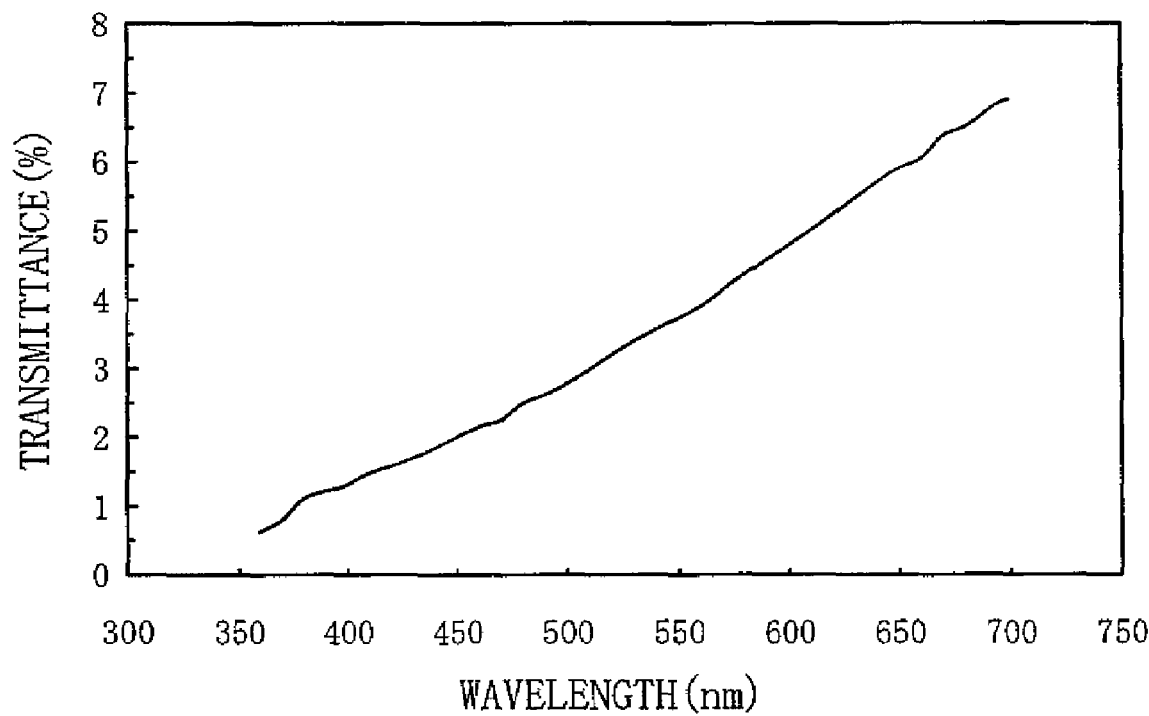
FIG. 4 shows a transmittance curve of a cooking top plate according to an example of the present invention.

Tables 1 to 7 show Examples 1 to 28 of the present invention, and Table 8 shows Examples 29 and 30 and Comparative Examples 1 and 2. FIG. 1 is an explanatory drawing of cooking top plates of Examples 1 to 12, FIG. 2 is an explanatory drawing of cooking top plates of Examples 13 to 28, and FIG. 3 is an explanatory drawing of cooking top plates of Examples 29 and 30. FIG. 4 shows a transmittance curve of a cooking top plate of Example 6.

TABLE 1

|  |  | Example 1 | Example 2 | Example 3 | Example 4 |
| --- | --- | --- | --- | --- | --- |
| Substrate | | Low-expansion crystallized glass | Low-expansion crystallized glass | Low-expansion crystallized glass | Low-expansion crystallized glass |
| Light shielding layer | First layer thickness (nm) | ★TiN (300) | ★TiN (250) | ★TiN (230) | ★TiN (200) |
| | Second layer thickness (nm) | SiN (50) | SiN (100) | SiN (150) | SiN (200) |
| | Third layer thickness (nm) | — | — | — | — |
| | Color tone | Black | Dark red | Copper | Gold |
| Average transmittance at 0.4 to 0.8 μm (%) | | 1 | 1.5 | 1 | 2 |
| Abrasion resistance (Number of strokes) | | 500 | 700 | 800 | 1,000 |
| Heat resistance (° C.) | | 500 | 520 | 550 | 560 |

TABLE 2

|  |  | Example 5 | Example 6 | Example 7 | Example 8 |
| --- | --- | --- | --- | --- | --- |
| Substrate | | Low-expansion crystallized glass | Low-expansion crystallized glass | Low-expansion crystallized glass | Low-expansion crystallized glass |
| Light shielding layer | First layer thickness (nm) | ★Ti (80) | ★Ti (65) | ★Ti (70) | ★Ti (200) |
| | Second layer thickness (nm) | SiN (150) | SiN (100) | SiN (75) | SiN (200) |
| | Third layer thickness (nm) | — | — | — | — |
| | Color tone | Silver | Silver | Silver | Silver |
| Average transmittance at 0.4 to 0.8 μm (%) | | 1 | 3.5 | 2 | 2 |
| Abrasion resistance (Number of strokes) | | 700 | 600 | 500 | 1,000 |
| Heat resistance (° C.) | | 550 | 500 | 500 | 550 |

TABLE 3

|  |  | Example 9 | Example 10 | Example 11 | Example 12 |
| --- | --- | --- | --- | --- | --- |
| Substrate | | Low-expansion crystallized glass | Low-expansion crystallized glass | Low-expansion crystallized glass | Low-expansion crystallized glass |
| Light shielding layer | First layer thickness (nm) | ★Ti (20) | ★Si (200) | ★Si (20) | ★Si (400) |
| | Second layer thickness (nm) | SiN (500) | SiN (100) | SiN (150) | SiN (200) |
| | Third layer thickness (nm) | — | — | — | — |
| | Color tone | Gray | Dark silver | Gray | Dark red |

TABLE 3-continued

|  | Example 9 | Example 10 | Example 11 | Example 12 |
|---|---|---|---|---|
| Average transmittance at 0.4 to 0.8 μm (%) | 20 | 5 | 50 | 2 |
| Abrasion resistance (Number of strokes) | 1,000 | 600 | 700 | 700 |
| Heat resistance (° C.) | 580 | 550 | 570 | 600 |

TABLE 4

| | | Example 13 | Example 14 | Example 15 | Example 16 |
|---|---|---|---|---|---|
| Substrate | | Low-expansion crystallized glass | Low-expansion crystallized glass | Low-expansion crystallized glass | Low-expansion crystallized glass |
| Light shielding layer | First layer thickness (nm) | SiN (150) | SiN (500) | SiN (300) | TiO$_2$ (25) |
| | Second layer thickness (nm) | ★Si (200) | ★Si (50) | ★Si (500) | ★Ti (200) |
| | Third layer thickness (nm) | SiN (100) | SiN (500) | SiN (300) | SiN (150) |
| Color tone | | Yellow | Pale yellow | Ocher | Yellow |
| Average transmittance at 0.4 to 0.8 μm (%) | | 5 | 40 | 1 | 0.5 |
| Abrasion resistance (Number of strokes) | | 800 | 1,000 | 1,200 | 500 |
| Heat resistance (° C.) | | 550 | 600 | 600 | 520 |

TABLE 5

| | | Example 17 | Example 18 | Example 19 | Example 20 |
|---|---|---|---|---|---|
| Substrate | | Low-expansion crystallized glass | Low-expansion crystallized glass | Low-expansion crystallized glass | Low-expansion crystallized glass |
| Light shielding layer | First layer thickness (nm) | TiO$_2$ (50) | SiN (150) | SiN (150) | SiN (150) |
| | Second layer thickness (nm) | ★Ti (200) | ★Ti (200) | ★Ti (200) | ★Ti (200) |
| | Third layer thickness (nm) | TiO$_2$ (100) | SiN (150) | SiN (150) | SiN (150) |
| Color tone | | Light blue | Gold | Wine red | Wine red |
| Average transmittance at 0.4 to 0.8 μm (%) | | 0.5 | 0.5 | 0.5 | 0.5 |
| Abrasion resistance (Number of strokes) | | 500 | 800 | 800 | 800 |
| Heat resistance (° C.) | | 500 | 600 | 600 | 600 |

TABLE 6

| | | Example 21 | Example 22 | Example 23 | Example 24 |
|---|---|---|---|---|---|
| Substrate | | Low-expansion crystallized glass | Low-expansion crystallized glass | Low-expansion crystallized glass | Low-expansion crystallized glass |
| Light shielding layer | First layer thickness (nm) | SiN (100) | SiN (150) | SiN (225) | SiN (100) |
| | Second | ★TiN | ★TiN | ★TiN | ★TiN |

TABLE 6-continued

|  |  | Example 21 | Example 22 | Example 23 | Example 24 |
|---|---|---|---|---|---|
|  | layer thickness (nm) | (300) | (100) | (100) | (30) |
|  | Third layer thickness (nm) | SiN (100) | SiN (150) | SiN (150) | SiN (100) |
|  | Color tone | Violet | Gold | Metallic blue | Pale violet |
|  | Average transmittance at 0.4 to 0.8 μm (%) | 0.5 | 2 | 2 | 10 |
|  | Abrasion resistance (Number of strokes) | 900 | 1,000 | 1,000 | 800 |
|  | Heat resistance (° C.) | 600 | 600 | 600 | 600 |

TABLE 7

|  |  | Example 25 | Example 26 | Example 27 | Example 28 |
|---|---|---|---|---|---|
|  | Substrate | Low-expansion crystallized glass | Low-expansion crystallized glass | Low-expansion crystallized glass | Low-expansion crystallized glass |
| Light shielding layer | First layer thickness (nm) | SiN (150) | SiN (50) | SiN (200) | SiN (20) |
|  | Second layer thickness (nm) | ★AlTiN (300) | ★W (200) | ★NbN (300) | ★Ti (20) |
|  | Third layer thickness (nm) | SiN (150) | SiN (200) | SiN (150) | ★Si (200) |
|  | Fourth layer thickness (nm) | — | — | — | SiN (150) |
|  | Color tone | Yellow | Gray | Blue | Silver |
|  | Average transmittance at 0.4 to 0.8 μm (%) | 0.5 | 1 | 0.5 | 2 |
|  | Abrasion resistance (Number of strokes) | 1,000 | 800 | 800 | 700 |
|  | Heat resistance (° C.) | 700 | 520 | 510 | 530 |

TABLE 8

|  | Example 29 | Example 30 | Comparative Example 1 | Comparative Example 2 |
|---|---|---|---|---|
| Substrate | Low-expansion crystallized glass | Low-expansion crystallized glass | Low-expansion crystallized glass | Low-expansion crystallized glass |
| Light shielding layer | Si (150) | Si (220) | Glass flux:inorganic pigment = 40:60 (mass ratio) | Luster coating (SL-900X-3) |
| Color tone | Dark silver | Dark silver | Black | Black |
| Average transmittance at 0.4 to 0.8 μm (%) | 3 | 1 | 5 | 1.8 to 2.2 |
| Abrasion resistance (Number of strokes) | 300 | 350 | 5 | 10 |
| Heat resistance (° C.) | 350 | 350 | 600 | 600 |

A glass was molded into a sheet through a roll out method using a metal roll subjected to surface treatment through sandblasting for a satin-like surface, to thereby obtain a crystallized glass sheet having a rough surface on one side and a smooth surface on the other. Next, as shown in FIGS. 1 to 3, the glass sheet was subjected to heat treatment, to thereby obtain a substrate 11 made of a transparent crystallized glass (N-0, available from Nippon Electric Glass Co., Ltd., average linear thermal expansion coefficient of $-5 \times 10^{-7}$/° C. at 30 to 500° C.). A first surface (working surface) 11a of the substrate 11 was a smooth surface having a surface roughness Rmax of less than 0.5 μm, and a second surface (non-working surface)

11b of the substrate 11 was a rough surface having a surface roughness Rmax of 4 μm. As shown in FIGS. 1 and 2, a light shielding layer 12 composed of a light shielding film 12a and an antioxidant film 12b was formed on the second surface 11b of the substrate 11 through sputtering using each film material and to each film thickness shown in Tables 1 to 7, to thereby produce a cooking top plate 10 of each of Examples 1 to 28. As shown in FIG. 3, a light shielding layer 12 composed of a light shielding film 12a was formed on the second surface 11b of the substrate 11 through sputtering using each film material and to each film thickness shown in Table 8, to thereby produce a cooking top plate 10 of each of Examples 29 and 30. In columns of Tables 1 to 7, the light shielding film 12a is represented by a star indicated on the left of a material name. For example, the light shielding layer 12 of Example 1 is composed of a light shielding film 12a of TiN as a first layer and an antioxidant film 12b of SiN as a second layer. Further, the light shielding layer 12 of Example 13 is composed of an antioxidant layer 12b of SiN as a first layer, a light shielding film 12a made of Si as a second layer, and an antioxidant film 12b of SiN as a third layer. The light shielding layer 12 of Example 28 has two layers of the light shielding film 12a and is composed of an antioxidant film 12b of SiN as a first layer, a light shielding film 12a of Ti as a second layer, a light shielding film 12a of Si as a third layer, and an antioxidant film 12b of SiN as a fourth layer. The light shielding layer 12 of Example 29 is composed of a light shielding film 12a of Si alone.

In Comparative Example 1, a glass frit having a composition of 4.0% $Li_2O$, 15.0% $Al_2O_3$, 34.0% $SiO_2$, 40.0% PbO, 4.0% $B_2O_3$, 2.0% $TiO_2$, and 1.0% $ZrO_2$ in mass % was prepared. Next, a black pigment powder having a composition of 15.0% $Cr_2O_3$, 45.0% $Fe_2O_3$, 30.0% $CO_3O_4$, 5.0% NiO, 3.0% $Al_2O_3$, and 2.0% $SiO_2$ in mass % was prepared. 40 mass % of the glass frit and 60 mass % of the black pigment powder were mixed, and 60 parts by mass of an acrylic organic binder was added to 100 parts by mass of the mixture. Then, butyl Carbitol acetate was further added to the mixture to a viscosity allowing easy printing, to thereby form a paste. The paste was applied onto a substrate of the same transparent crystallized glass as those of Examples through printing and the whole was calcined at 820° C., to thereby produce a cooking top plate.

In Comparative Example 2, a black luster paste (SL-900X-3) was applied onto a substrate of the same transparent crystallized glass as those of Examples using a 250-mesh screen. The whole was dried and baked at 830° C., to thereby produce a cooking top plate.

A heat resistant resin (GSX, available from Daishin Paint Co., Ltd.) was partially applied onto each of the thus-formed light shielding layers, and whether a portion having the heat resistant resin applied appears different was visually observed from a side of a surface on which the light shielding layer was not formed.

A transmittance at wavelength of 0.4 to 0.8 μm and an average transmittance at wavelength of 1.0 to 2.5 μm were measured using a spectrophotometer. A transmittance at wavelength of 0.4 to 0.8 μm was measured by applying a light of the respective wavelength from a side of the surface on which the light shielding layer was not formed. An average transmittance at wavelength of 1.0 to 2.5 μm was measured by applying a light of the respective wavelength from a side of the surface on which the light shielding layer was formed.

Abrasion resistance was measured by: dropping a drop of water on the light shielding layer of the top plate using a dropping pipette; placing a rectangular parallelepiped weight of 1.3 kg having #220 SiC sandpaper attached on a base (4×8 cm) thereof on the light shielding layer; and moving the weight in a reciprocating motion at an amplitude length of 10 cm. The abrasion resistance was evaluated by number of strokes of the weight required to scrape off the light shielding layer through abrasion to show the surface of the substrate. That is, a larger number of strokes of the weight required for indication of abrasion such as showing of the substrate surface represents higher abrasion resistance.

Heat resistance was evaluated from a temperature at which a change in film properties such as a color tone change was observed while the top plate was heated in an electric furnace. That is, a higher temperature at which a change in film properties such as a color tone change was observed represents higher heat resistance.

The results of the experiment confirmed that the top plates of Examples 1 to 30 had high abrasion resistance and that the top plates of Examples 1 to 28, in particular, had no problem regarding heat resistance. Further, even when the heat resistant resin was partially applied onto the light shielding layer, a portion having the heat resistant resin bonded did not appear different from a side of the surface on which the light shielding layer was not formed. Further, a light from an illumination or the like reflected the light shielding layer did not directly enter into the eye and was not glaring.

The top plates of Examples 10, 11, 12, 13, 14, 15, 28, 29, and 30 had high average transmittance of 65%, 80%, 45%, 60%, 75%, 35%, 50%, 67%, and 61%, respectively at wavelength of 1.0 to 2.5 μm. As shown in FIG. 4, the top plate of Example 6 had a transmittance of 1.5 to 6.0% at wave length of 0.45 to 0.75 μm. Thus, when a indicator displaying an applied electric energy was provided on a side of the second surface (non-working surface) of the substrate, a light of any color such as blue, green, yellow, or red of the indicator transmitted the light shielding layer, which could be visually observed.

On the other hand, the top plates of Comparative Examples 1 and 2 had low abrasion resistance. In particular, when the heat resistant resin was partially applied onto the light shielding layer of the top plate of Comparative Example 1, a portion having the heat resistant resin bonded appeared different from a side of the surface on which the light shielding layer was not formed.

Figure 5:
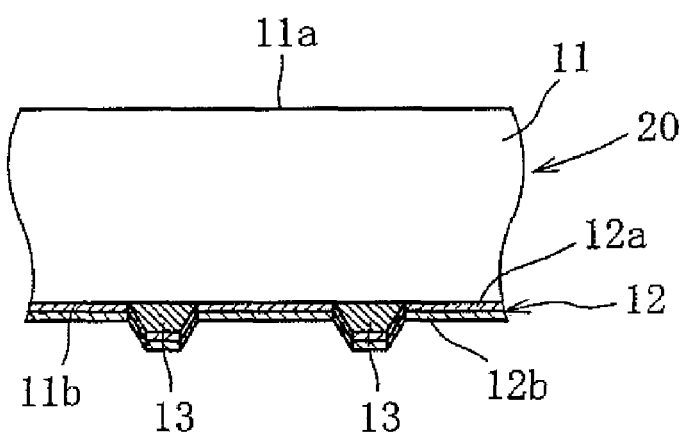
FIG. 5 is a partial sectional view of a cooking top plate according to yet another example of the present invention.

A cooking top plate 20 shown in FIG. 5 includes: a printing layer 13 (thickness of 5 μm) containing a glass frit and a pigment formed on a second surface (non-working surface) 11b of a substrate 11 through screen printing, for forming characters and/or figures; and a light shielding layer 12 composed of a light shielding film 12a and an antioxidant film 12b through sputtering thereon. A material and a form of the substrate 11, a layer structure of the light shielding layer 12, a material and a thickness of each layer, and the like are the same as those described in above Examples, and thus redundant details are omitted.

The invention claimed is:

1. A cooking top plate made of a low-expansion glass having a property of transmitting visible light, comprising: a substrate having a first surface facing outside of a cooking device and a second surface facing inside of the cooking device; and a light shielding layer formed on the second surface of the substrate through vapor deposition, wherein the light shielding layer comprises one or more light shielding films and one or more antioxidant films, and a total number of the light shielding films and the antioxidant films is within 2 to 4, wherein the cooking top plate has an average transmittance of 10% or less at wavelength of 0.4 to 0.8 .mu.m and has a transmittance of 0.25% or more at wavelength of 0.45 to 0.75 .mu.m.

2. A cooking top plate according to claim 1, wherein the vapor deposition comprises sputtering.

3. A cooking top plate according to claim 1, wherein the light shielding film contains one component selected from the following (a), (b), (c), and (d): (a) one metal selected from the group consisting of Si, Ti, Al, Nb, W, Mo, Sn, Cr, Pt, and Au; (b) one alloy selected from the group consisting of stainless steel, hastelloy, inconel, and nichrome; (c) a nitride of one alloy selected from the group consisting of stainless steel, hastelloy, inconel, and nichrome; and (d) a nitride of at least one metal selected from the group consisting of Ti, Nb, W, and Mo.

4. A cooking top plate according to claim 1, wherein the antioxidant film is formed on the light shielding film.

5. A cooking top plate according to claim 1, wherein the antioxidant film is formed between a surface of the substrate and the light shielding film.

6. A cooking top plate according to claim 1, wherein the antioxidant film contains one component selected from the following (e) and (f): (e) a nitride of at least one metal selected from the group consisting of Si, Ti, Al, Nb, W, Mo, Ta, and Sn; and (f) an oxide of one metal selected from the group consisting of Si, Al, and Ti.

7. A cooking top plate according to claim 1, wherein at least one of the first surface and the second surface of the substrate comprises a rough surface.

8. A cooking top plate according to claim 1, wherein the second surface of the substrate comprises a rough surface and the first surface of substrate comprises a smooth surface.

9. A cooking top plate according to claim 8, wherein the rough surface has a surface roughness Rmax of 0.5 to 30 .mu.m.

* * * * *